US012715797B1

(12) United States Patent
Kaminski

(10) Patent No.: US 12,715,797 B1
(45) Date of Patent: Aug. 25, 2026

(54) LOW-PRESSURE INJECTION SYSTEM FOR PRESSURIZED FLUID OR GAS LINES

(71) Applicants: Michael Gonek, Hollywood, CA (US); Michael Joshua Kaminski, Rochester, NY (US)

(72) Inventor: Mike Kaminski, Rochester, NY (US)

( * ) Notice: Subject to any disclaimer, the term of this patent is extended or adjusted under 35 U.S.C. 154(b) by 0 days.

(21) Appl. No.: 19/347,705

(22) Filed: Oct. 1, 2025

Related U.S. Application Data

(60) Provisional application No. 63/785,483, filed on Apr. 8, 2025.

(51) Int. Cl.
*C02F 1/68* (2023.01)

(52) U.S. Cl.
CPC ........ *C02F 1/685* (2013.01); *C02F 2201/005* (2013.01); *C02F 2209/001* (2013.01); *C02F 2209/005* (2013.01); *C02F 2307/14* (2013.01); *Y10T 137/87346* (2015.04)

(58) Field of Classification Search
CPC ................ C02F 1/686; C02F 2201/005; C02F 2209/001; C02F 2209/005; C02F 2307/14; Y10T 137/87346
USPC ..................................................... 137/599.12
See application file for complete search history.

(56) References Cited

U.S. PATENT DOCUMENTS 445,909 A * 2/1891 Shontz .................... C02F 1/686 137/559
485,920 A * 11/1892 Enholm ................ B01F 25/316 137/205.5
2,243,258 A * 5/1941 Munn ..................... C02F 1/686 137/559
3,104,823 A * 9/1963 Hayes .................... G05D 11/00 137/890
3,601,079 A * 8/1971 Giles ................. B01F 25/31243 137/892
3,689,237 A * 9/1972 Stark ..................... B01F 35/833 261/78.2
3,819,298 A 6/1974 Hadnagy et al.
3,968,932 A * 7/1976 Kimmell .............. A01C 23/042 422/282
4,173,178 A * 11/1979 Wieland .................. B01F 25/43 99/323.1
4,399,871 A 8/1983 Adkins et al.
(Continued)

FOREIGN PATENT DOCUMENTS

WO 2005068836 A1 7/2005

*Primary Examiner* — William M Mccalister
(74) *Attorney, Agent, or Firm* — The Buche Law Firm, P.C.; Bryce A. Johnson; John K. Buche

(57) ABSTRACT

A fluid injection system delivers low-pressure fluids or gases into a pressurized main line by employing a sequenced bypass mechanism with electronically controlled solenoid valves. A branch line, connected at two points to the main line, comprises solenoid valves for flow isolation and pressure venting, a low-pressure pump for additive injection, and a controller for programmable operation. By temporarily diverting and depressurizing a segment of the branch line, the system enables precise and efficient dosing of chemicals or treatment fluids into high-pressure environments using economical low-power components. This architecture reduces cost, complexity, and energy consumption while supporting applications such as water treatment, chemical dosing, and automated pool maintenance.

22 Claims, 6 Drawing Sheets

(56) References Cited

U.S. PATENT DOCUMENTS

| | | | | |
|---|---|---|---|---|
| 4,422,830 | A | 12/1983 | Perkins | |
| 4,635,848 | A | 1/1987 | Little | |
| 4,781,467 | A * | 11/1988 | Williams ................ | B01F 35/00 366/177.1 |
| 5,209,298 | A | 5/1993 | Ayres | |
| 5,344,044 | A | 9/1994 | Hayden et al. | |
| 5,406,970 | A | 4/1995 | Marshall et al. | |
| 5,743,960 | A | 4/1998 | Tisone | |
| 6,109,286 | A * | 8/2000 | Johnston .................. | B67D 7/74 137/565.33 |
| 6,609,500 | B2 | 8/2003 | Ricco et al. | |
| 7,926,503 | B2 | 4/2011 | Kuhnle et al. | |
| 8,434,697 | B1 | 5/2013 | Olt | |
| 2018/0056313 | A1* | 3/2018 | Chen ....................... | F04B 19/22 |

* cited by examiner

| TIME → | $T_0$ | $T_1$ | $T_2$ | $T_3$ | $T_4$ |
| --- | --- | --- | --- | --- | --- |
| Solenoid A | OPEN | CLOSED | CLOSED | OPEN | OPEN |
| Solenoid B | CLOSED | CLOSED | OPEN | CLOSED | CLOSED |
| Solenoid C | CLOSED | CLOSED | CLOSED | CLOSED | OPEN |
| Pump | OFF | OFF | OFF | ON | OFF |
| Pressure | HIGH | STEADY | DROP | LOW | RESTORED |
| Action | IDLE | ISOLATE | VENT | INJECT | FLUSH |
| FIGURE | 2 | 2A | 2B | 2C | 2D |

FIG. 1

LOW-PRESSURE INJECTION SYSTEM FOR PRESSURIZED FLUID OR GAS LINES

CROSS-REFERENCE TO RELATED APPLICATIONS

This application claims the benefit and priority of U.S. Prov. Pat. App. Ser. No. 63/785,483 (Apr. 8, 2025) for a low-pressure injection system for pressurized fluid or gas lines. See Application Data Sheet (ADS). The identified provisional document is hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

This invention relates to fluid injection systems for pressurized pipelines, and more particularly to a low-pressure injection system utilizing electronically controlled solenoid valves and bypass mechanisms to enable precise dosing of treatment fluids, gases, or additives into high-pressure fluid lines using low-power pumps in applications including water treatment, chemical processing, agricultural fertigation, and industrial fluid handling systems.

Listing of the Prior Art

The following references might be to be related to the disclosed subject matter:

| U.S. Patents | | | |
|---|---|---|---|
| Patent No. | Inventor(s) | Issue Date | Title |
| U.S. Pat. No. 3,819,298 | Hadnagy et al. | Jun. 25, 1974 | Chemical injection system |
| U.S. Pat. No. 4,399,871 | Adkins et al. | Aug. 23, 1983 | Chemical injection valve with openable bypass |
| U.S. Pat. No. 4,422,830 | Perkins | Dec. 27, 1983 | Pipeline additive injection system |
| U.S. Pat. No. 4,635,848 | Little | Jan. 13, 1987 | Irrigation additive delivery system |
| U.S. Pat. No. 5,209,298 | Ayres | May 11, 1993 | Pressurized chemical injection system |
| U.S. Pat. No. 5,344,044 | Hayden et al. | Sep. 6, 1994 | Additive injection system and method |
| U.S. Pat. No. 5,406,970 | Marshall et al. | Apr. 18, 1995 | Chemical injection system |
| U.S. Pat. No. 5,743,960 | Tisone | Apr. 28, 1998 | Precision metered solenoid valve dispenser |
| U.S. Pat. No. 6,609,500 | Ricco et al. | Aug. 26, 2003 | Device for controlling the flow of a high-pressure pump in a common-rail fuel injection system of an internal combustion engine |
| U.S. Pat. No. 7,926,503 | Kuhnle et al. | Apr. 19, 2011 | Fluid injection system |
| U.S. Pat. No. 8,434,697 | Olt | May 7, 2013 | Autonomous system for injecting additives into irrigation water |

| International Published Patent Applications | | | |
|---|---|---|---|
| App. No. | Inventor(s) | Pub. Date | Title |
| WO2005068836A1 | Ruppert et al. | Jul. 28, 2005 | Dosing system for dosing of a fluid additive into a pressurized water supply line |

See the Information Disclosure Statements (IDS) of record.

Background of the Invention

Traditional fluid injection systems for introducing additives into pressurized lines face significant technical and economic challenges. Conventional approaches require high-pressure pumps capable of generating pressure exceeding that of the main line to force additives against the system pressure. For example, injecting chemicals into a 15 PSI pressurized pool filtration system typically requires pumps rated at 20-30 PSI or higher, necessitating expensive high-power equipment. A typical high-pressure peristaltic pump suitable for such applications may consume 750 watts of power and cost upwards of $1,000, compared to low-pressure alternatives that consume only 12 watts and cost approximately $10-50.

Furthermore, conventional high-pressure injection systems create continuous pressure drops in the main line during operation, reducing overall system efficiency. The present invention addresses this limitation by providing limited continuous pressure drop in the main circuit during normal operation, as the bypass branch operates independently without affecting main line flow dynamics except during brief flushing intervals. During the depressurization phase, the system achieves pressure reductions of at least 80% or about 80% and typically 85-95% of the main circuit pressure within the isolated branch section, enabling effective low-pressure injection while maintaining main line integrity.

The present invention provides unexpected technical advantages over conventional injection systems. The system enables precise dosing using low-power pumps consuming only 12-50 watts compared to high-pressure alternatives requiring 750+ watts, representing up to a 15:1 power reduction. Unlike Venturi injectors that create permanent differential pressure losses across the main circuit, the present system eliminates continuous pressure drop during normal operation, maintaining full system efficiency. The controlled depressurization and flushing cycle provides exceptional dosing repeatability and precision, overcoming the flow-rate dependent variability inherent in Venturi-based systems.

The prior art includes various chemical injection systems, as disclosed in patents such as U.S. Pat. No. 3,819,298 to Hadnagy et al., which describes a chemical injection system using a pressure tank and cam-operated solenoid valve. U.S. Pat. No. 4,422,830 to Perkins discloses a pipeline additive injection system, while U.S. Pat. No. 8,434,697 to Olt teaches an autonomous system for injecting additives into irrigation water. However, these systems generally rely on high-pressure pumps or operate only during specific flow conditions in the main line, rather than actively creating a controlled low-pressure injection environment.

Venturi injectors represent another conventional approach, but these devices create permanent pressure drops in the system, reduce flow efficiency, and lack precision control. The venturi effect requires continuous flow and creates suction proportional to flow rate, making precise dosing difficult and reducing overall system pressure permanently.

The fundamental problem addressed by this invention is the cost, complexity, and energy inefficiency of existing injection systems. Industries requiring chemical dosing into pressurized systems, including pool and spa treatment, water and wastewater treatment, agricultural fertigation, pharmaceutical processing, semiconductor manufacturing, and industrial cleaning systems, currently face the choice between expensive high-pressure pumps or inefficient venturi systems.

SUMMARY OF THE INVENTION

The present invention overcomes the limitations of prior art injection systems by providing a low-pressure injection system that enables inexpensive, low-power pumps to inject fluids or gases into high-pressure lines through a novel sequenced valve operation. The system temporarily creates a depressurized injection zone within a branch line connected to the main pressurized line, allowing low-pressure pumps to inject additives before flushing the treated fluid back into the main line.

The system comprises a branch line having inlet and outlet connections to a main pressurized fluid line, creating a bypass loop. Within this branch line, the system includes a first solenoid valve (Solenoid A) positioned near the inlet connection for isolating the branch line from main line pressure, a second solenoid valve (Solenoid B) configured to vent the isolated branch line section to atmosphere or a waste collection system, and a third solenoid valve (Solenoid C) or equivalent check valve positioned near the outlet connection for controlling the return flow to the main line. A low-power pump, such as a peristaltic pump, injects additive fluid into the branch line through a chemical inlet port during the depressurized phase.

The system operates through a precisely timed five-phase sequence controlled by a programmable logic controller (PLC) or microcontroller. During the filling phase (To), all solenoids remain closed while the branch line fills with pressurized fluid from the main line. In the isolation phase ($T_1$), Solenoid A closes to isolate the branch line section. The depressurization phase ($T_2$) involves opening Solenoid B to vent pressure and fluid contents to atmosphere or waste collection, creating a low-pressure zone. During the injection phase ($T_3$), the low-pressure pump activates to inject additive fluid into the depressurized branch line. Finally, the flushing phase ($T_4$) involves closing Solenoid B and opening both Solenoid A and Solenoid C to restore main line pressure and flush the additive-treated fluid back into the main line.

This approach enables precise, programmable dosing using equipment costing up to 100 times less than conventional high-pressure systems while consuming significantly less energy. The system finds applications across multiple industries requiring controlled chemical injection into pressurized fluid systems.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 1 is a logic table illustrating the operational phases $T_0$ through $T_4$ of the disclosed low-pressure injection system, showing the states of Solenoids A, B, and C, pump operation, pressure conditions, and corresponding system actions for each phase;

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Figure 2:
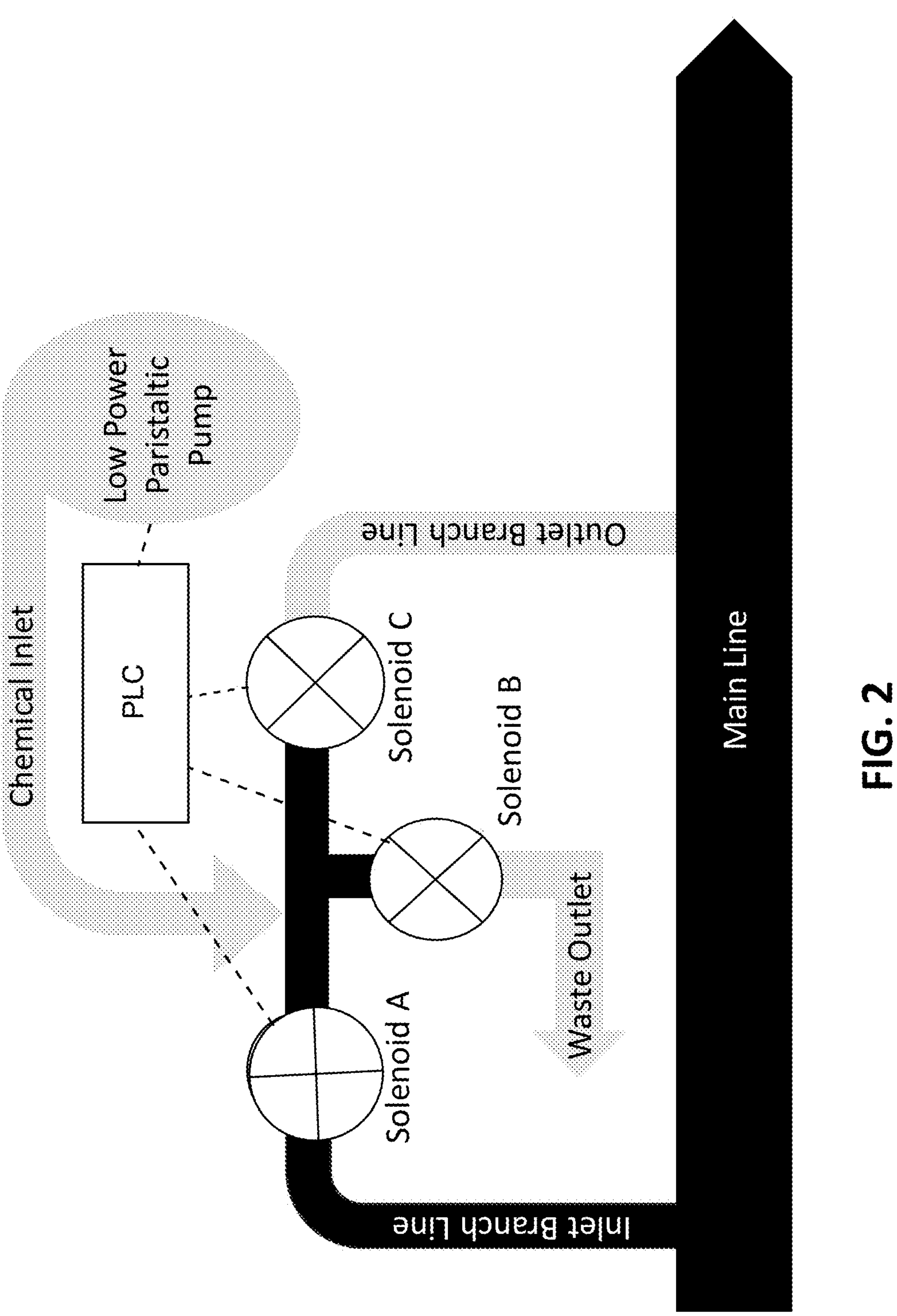
FIG. 2 is a schematic diagram of the complete system showing the main pressurized line, inlet and outlet branch line connections, Solenoid A (isolation valve), Solenoid B (vent valve), Solenoid C (outlet valve), low-power peristaltic pump, chemical inlet port, waste outlet connection, and PLC controller in the idle/filling configuration.

This system relates to a method and system for enabling fluid or gas injection from a low-pressure pump or reservoir into a high-pressure main line, using an electronically controlled solenoid bypass configuration. See FIGS. 1 and 2 through 2D. As shown in FIG. 2, A branch of pipe, with an entrance and an egress are connected to a main pressurized line of fluid or gas as depicted. As shown, the system is controlled by a microcontroller or programmable logic controller (PLC), which sequences the solenoid valves and activates a low-pressure fluid pump. FIG. 1 shows a table of the valve logic for operating the system as shown in FIGS. 2 through 2 D. The valve logic for Solenoids A, B and C and the low pressure pump are depicted in the table at $T_0$-Filling Phase, $T_1$-Isolation Phase, $T_2$-Depressurization Phase, $T_3$-Injection Phase, $T_4$-Flushing Phase.

Referring to the drawings, and particularly to FIG. 2, the low-pressure injection system comprises a main pressurized line carrying fluid or gas under pressure, typically in the range of 5-50 PSI, though the system can accommodate various pressure ranges. An inlet branch line connects to the main line at an upstream connection point, while an outlet branch line connects to the main line at a downstream connection point, creating a bypass loop around a section of the main line. A pump and injection line is provided to the loop along with a waste or venting line.

The inlet branch line incorporates a first solenoid valve, designated Solenoid A, positioned adjacent to the connection with main line. Solenoid A comprises a normally closed electrically actuated valve capable of completely blocking fluid flow when energized. In the preferred embodiment, Solenoid A operates on 12V DC power and interfaces with the control system through a MOSFET or relay circuit. The valve body of Solenoid A should be rated for the maximum expected pressure of main line plus a suitable safety margin.

A second solenoid valve, designated Solenoid B, is positioned within the branch line system and configured to vent the isolated branch line section. Solenoid B connects to a waste outlet that may lead to atmosphere, a waste collection vessel, or in some embodiments, to the suction side of the injection pump to create additional vacuum assistance. The positioning of Solenoid B can, in some cases, be critical to system operation—in preferred embodiments, it connects to a vertical riser extending upward from a tee-junction in the branch line, ensuring that primarily gas and minimal liquid is vented during the depressurization phase, achieving "non-burping" operation.

A third solenoid valve, designated Solenoid C, is positioned near the outlet connection between outlet branch line and main line. Alternatively, Solenoid C may be replaced with a duckbill check valve or similar one-way valve having a very low cracking pressure, typically under 0.12 PSI, to minimize the pressure required for fluid return to the main line during the flushing phase.

In applications requiring precise flow restoration, Solenoid C may be replaced with a low-cracking-pressure check valve, such as a duckbill valve, having a cracking pressure of approximately 0.05 to 0.15 PSI, and preferably about 0.12 PSI or less. This configuration minimizes the pressure differential required for fluid return during the flushing phase while preventing backflow from the main line during injection operations.

The system includes a low-power pump preferably a peristaltic pump rated for 12-50 watts power consumption, though diaphragm pumps, gear pumps, or other positive displacement pump types may be suitable. The pump connects to a chemical inlet port 26 that introduces additive fluid into the branch line system. The pump need only overcome the minimal residual pressure in the depressurized branch line, typically less than 1 PSI, making low-cost, low-power pumps entirely adequate for the application.

The low-pressure pump architecture ensures the pump remains hydraulically isolated from the main circuit during injection operations, as the pump only communicates with the depressurized branch section through the chemical inlet port. This isolation prevents back-pressure from the main circuit from affecting pump performance and eliminates the need for check valves between the pump and injection point. The pump may comprise various displacement pump technologies including peristaltic, diaphragm, gear, syringe, piston, piezoelectric, or MEMS-based pumps, with selection based on application requirements, chemical compatibility, and precision needs.

A programmable logic controller (PLC) or microcontroller governs the operation of all system components. The PLC connects to Solenoids A, B, and C through appropriate relay or solid-state switching circuits and controls the activation of pump. The PLC may include timing circuits, pressure sensors, flow sensors, or other instrumentation to optimize system operation and provide diagnostic feedback.

Advanced control implementations may incorporate adaptive algorithms, model-predictive control, or artificial intelligence-based optimization to dynamically adjust cycle timing, dosing quantities, and operational parameters based on real-time system feedback. The controller may integrate sensor arrays including pressure sensors, flow sensors, pH meters, oxidation-reduction potential (ORP) sensors, turbidity meters, conductivity sensors, and temperature sensors to provide comprehensive process monitoring and closed-loop control optimization.

The system may optionally include an intermediate chamber or reservoir positioned between Solenoid A and the junction where Solenoids B and C connect. This chamber provides volume for temporarily storing pressurized fluid during the filling phase and collecting injected additives during the injection phase.

Figure 2A:
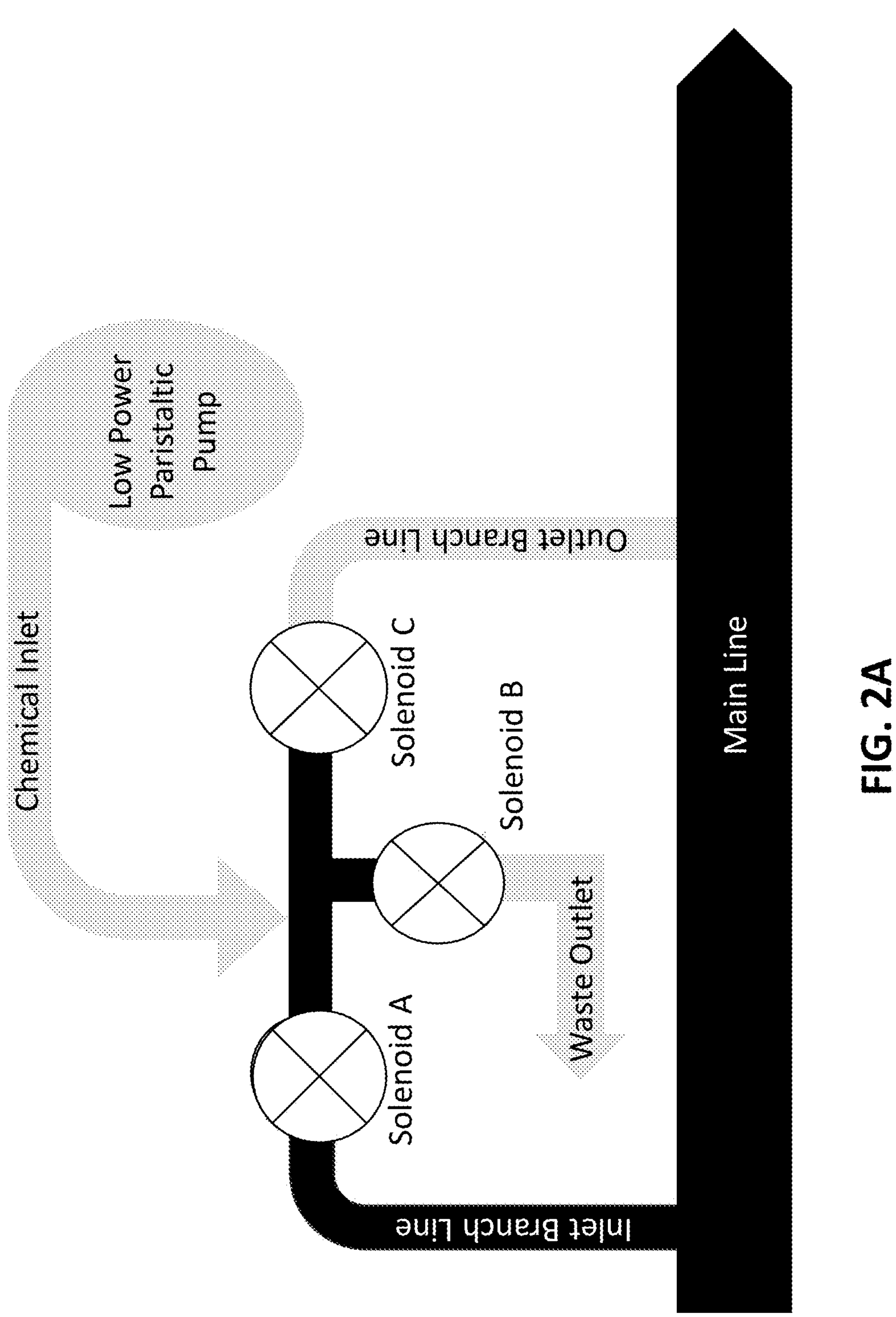
FIG. 2A depicts the system in the isolation phase ($T_1$) with Solenoid A closed to isolate the branch line from main line pressure while Solenoids B and C remain closed.
Figure 2B:
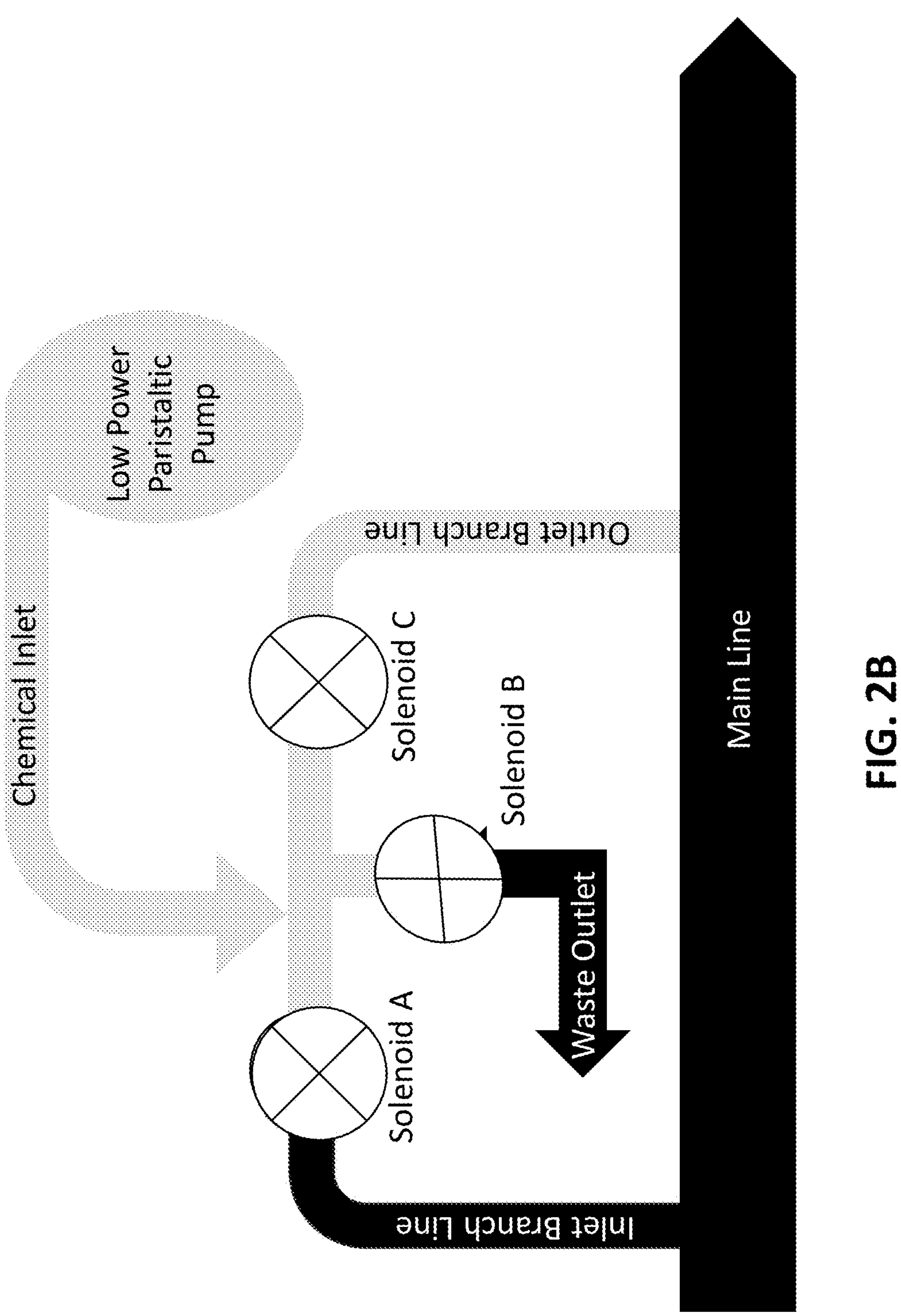
FIG. 2B illustrates the depressurization phase ($T_2$) with Solenoid A remaining closed, Solenoid B opened to vent pressure and contents through the waste outlet, and Solenoid C closed.
Figure 2C:
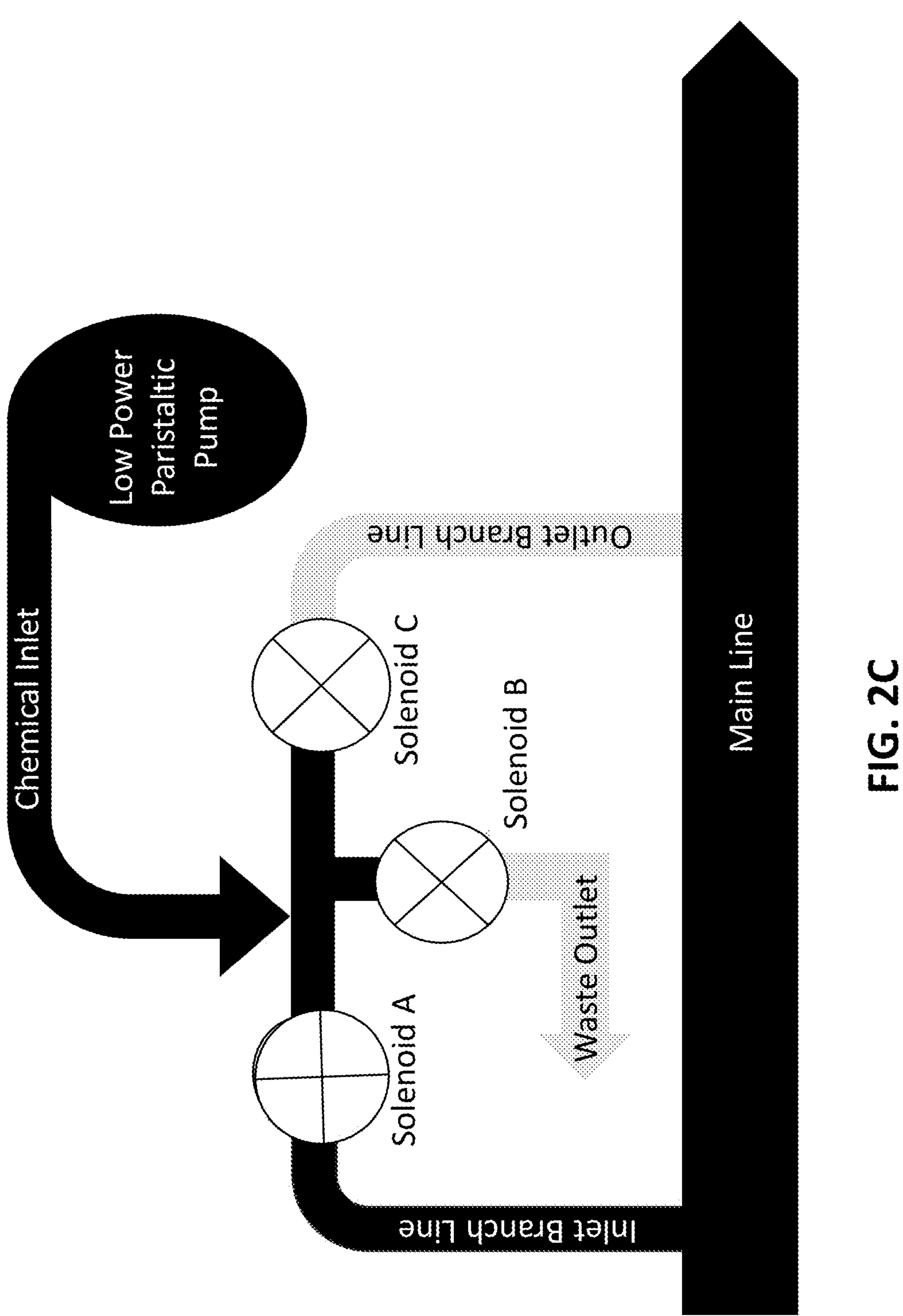
FIG. 2C shows the injection phase ($T_3$) with all solenoids closed while the low-power pump actively injects additive fluid through the chemical inlet into the depressurized branch line; and, FIG. 2D demonstrates the flushing phase ($T_4$) with Solenoid A and Solenoid C opened to allow main line pressure to flush the additive-treated contents back into the main pressurized line while Solenoid B remains closed.
Figure 2D:
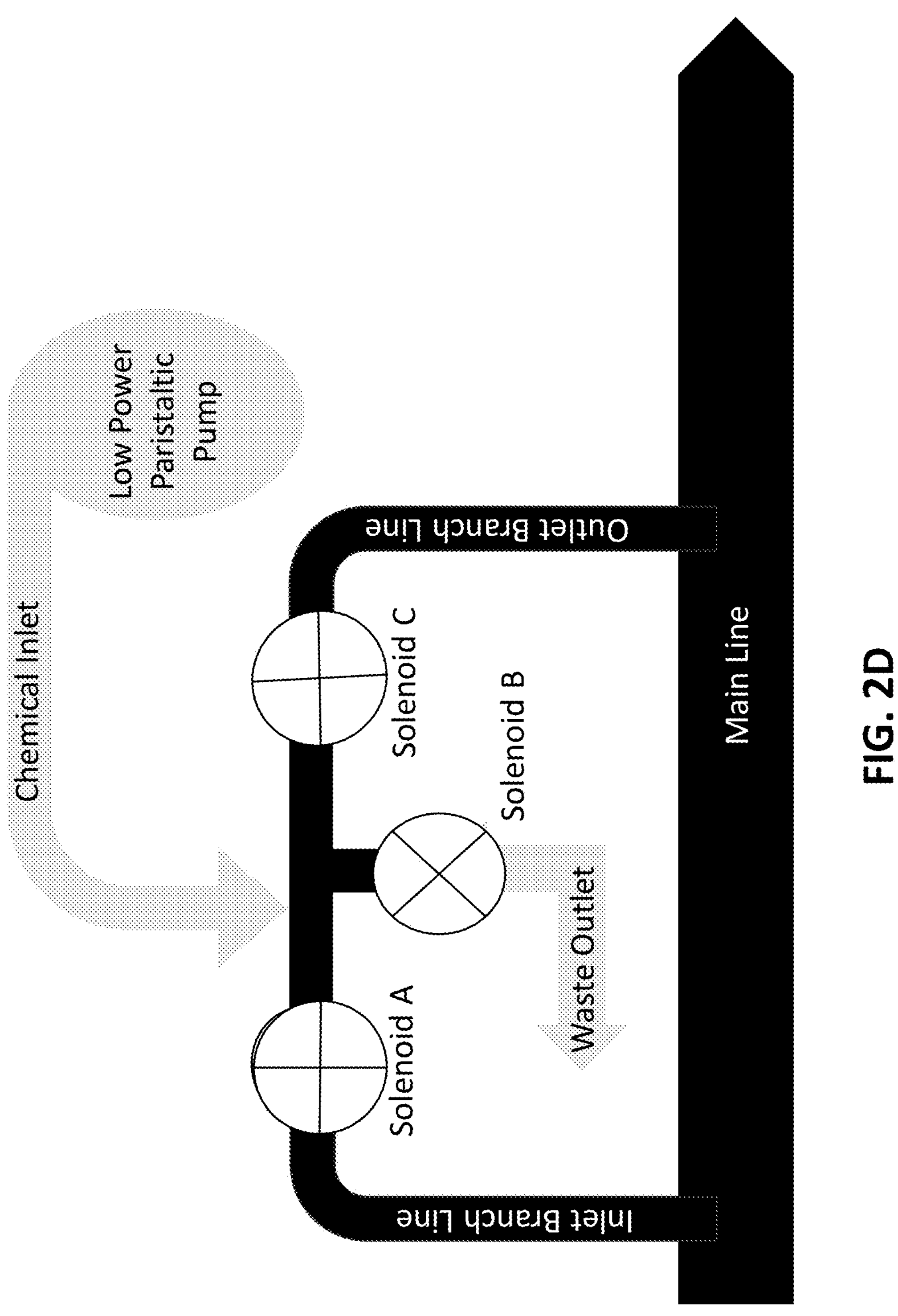

Referring to FIG. 1 and the sequential operation shown in FIGS. 2 through 2D, the system operates through the following detailed five-phase cycle:

Phase $T_0$—Filling Phase (FIG. 2): The system begins with all solenoids in their normal closed state. Main line pressure forces fluid through the inlet connection into inlet branch line, filling the branch line volume and any intermediate chamber. The system reaches pressure equilibrium with main line, and no flow occurs through the branch line as both inlet and outlet paths are blocked by closed solenoids. Pump remains inactive during this phase.

Phase $T_1$—Isolation Phase (FIG. 2A): PLC energizes Solenoid A to maintain its closed state (or allows it to remain closed if normally closed), effectively isolating the fluid volume within the branch line from the pressure and flow of main line 10. Solenoids B and C remain closed, trapping the pressurized fluid within the isolated branch line section. This phase typically lasts 100-500 milliseconds, sufficient to ensure complete valve closure and pressure isolation.

Phase $T_2$—Depressurization Phase (FIG. 2B): PLC opens Solenoid B while maintaining Solenoids A and C in closed positions. The trapped pressurized fluid vents through waste outlet 20, rapidly reducing pressure within the isolated branch line section. The vertical orientation and positioning of Solenoid B allows preferential venting of gas/vapor while minimizing liquid loss. Complete depressurization typically occurs within 1-3 seconds, depending on branch line volume and vent port sizing.

Phase $T_3$—Injection Phase (FIG. 2C): With pressure vented, PLC closes Solenoid B and activates pump. The pump draws additive fluid through chemical inlet port 26 and injects it into the depressurized branch line. Since the branch line pressure is now at or near atmospheric pressure, the low-power pump easily overcomes the minimal back-pressure. Injection continues for a predetermined time, typically 5-30 seconds, depending on the desired additive dosage. The injected fluid collects within the branch line volume and any intermediate chamber.

Phase $T_4$—Flushing Phase (FIG. 2D): PLC deactivates pump and opens Solenoids A and C while maintaining Solenoid B closed. Main line pressure immediately restores pressure within the branch line, creating a pressure wave that propels the additive-treated fluid through outlet branch line and back into main line. The timing of Solenoid C opening may be delayed 10-50 milliseconds after Solenoid A opening to ensure proper pressure restoration before outlet flow begins. The pressure differential and flow dynamics effectively flush the entire additive dose into the main line flow stream.

The cycle timing is programmable through PLC, allowing optimization for different applications, fluid properties, and dosing requirements. Typical complete cycles range from 30 seconds to several minutes, depending on the application requirements and desired additive concentration.

Multiple systems may be connected in parallel to a common controller for synchronized or sequential operation, enabling complex dosing schedules or multiple chemical injection. The modular design allows scaling from single residential applications to large industrial installations requiring multiple injection points or different chemical additives.

Multiple branch circuit configurations enable simultaneous or sequential injection of different chemical additives through coordinated control systems. Each branch circuit may be configured with different additive injection capabilities, allowing a single main controller to manage complex dosing schedules involving multiple treatment chemicals.

The system accommodates both original equipment manufacturer (OEM) integration during initial system design and retrofit installation using standard tees, manifolds, or flanged connections to existing pressurized systems.

The system accommodates various fluid types including aqueous solutions, oils, gases, and specialized chemicals. Material selection for wetted components depends on chemical compatibility requirements, with options including stainless steel, PVC, PTFE, and specialized alloys for corrosive applications.

The system finds application across diverse industries including biomedical infusion systems where the pressurized medium comprises blood or intravenous fluids and additives include therapeutic or chemotherapeutic agents. Gas injection applications support introduction of $CO_2$, $O_2$, anesthetic vapors, compressed air, or specialized gas mixtures into pressurized gas distribution systems. Semiconductor manufacturing applications enable precise dosing of acids, bases, or etchants into process baths, while wastewater treatment implementations support injection of disinfectants, flocculants, or coagulants into pressurized treatment lines.

Optional enhancements include pressure sensors within the branch line for monitoring depressurization effectiveness, flow sensors for verifying injection volumes, and communication interfaces for integration with larger process control systems. The system may also include leak detection for Solenoid B, achieved through hydrophobic membranes, wick systems, or collection tubes to prevent fluid loss during venting operations.

This detailed system description demonstrates how the invention enables precise, economical injection of additives into pressurized fluid systems using standard industrial components configured in a novel operational sequence, achieving results previously requiring expensive high-pressure equipment.

USE CASE EXAMPLE

In a typical pool scenario, the low-pressure injection system is employed to automate and precisely dose chemical additives-such as chlorine or pH balancing agents-into the circulating pool water. The system is integrated into the existing pressurized circulation line, enabling additives to be introduced without manual intervention and with significant cost and energy savings compared to conventional high-pressure pump systems. The main controller governs the operational cycle, ensuring that each step of the injection and flushing process is performed at the optimal time and for the proper duration.

The process begins with the branch line connected to the pool's circulation main line, both at an inlet and an outlet point, forming a bypass loop. When dosing is triggered, the PLC closes the flow isolation valve to segment the branch line and isolates a small volume of pressurized pool water. The vent valve then opens for a brief, carefully controlled interval to reduce internal pressure—without significant loss of liquid—to near atmospheric pressure. This depressurization step is crucial, as it allows a compact, low-power pump to effectively inject a predetermined quantity of chemical into the branch line via a dedicated chemical inlet port.

Once injection is complete, the system transitions to a flushing phase: the isolation and outlet valves are opened, allowing the restored main line pressure to propel the additive-laden water swiftly back into the primary pool circulation stream. This ensures thorough mixing and dispersion of the chemical, promoting homogeneous water quality throughout the pool. The timing of each valve and pump operation is programmable to suit the needs of residential or commercial pools, and can be dynamically adjusted based on real-time signals from water quality sensors, ensuring the process remains efficient and responsive to changing pool conditions.

This use case offers practical advantages for pool operators and homeowners alike. Precise control over chemical dosing mitigates risks of over- or under-dosing, reduces operational costs, and improves swimmer safety and comfort. The system is scalable for installations from small backyard pools to large public aquatic facilities, and its modular architecture allows for multiple additive types to be deployed from a single control hub, making it an ideal solution for modern automated pool management systems.

Additional application examples demonstrate the system's versatility: in irrigation systems, the controller manages fertilizer, nutrient solution, or pesticide injection into pressurized water lines; in industrial recirculation systems including cooling towers, the system provides automated chemical treatment; and in wastewater treatment facilities, the system enables precise dosing of treatment chemicals into pressurized conveyance lines without disrupting flow operations.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A method of introducing an additive into a circulating pressurized medium flowing through a main circuit operating under a main circuit pressure, comprising:

isolating a portion of a dual-lumen conduit forming a branch circuit at a branch point off of the main circuit by actuating an isolation valve or flow-blocking component;

depressurizing the isolated portion via a depressurization valve or flow-blocking component to a low or near-atmospheric condition, including a reduction to between 0 and 30% of the main-circuit pressure, where the depressurizing occurs with minimized continuous pressure drop in the main circuit;

injecting a measured dose of the additive to the isolated portion using a pump that is in fluid communication with the isolated portion but not in fluid communication with the main-circuit; and restoring flow communication between the isolated portion of the branch circuit and the main circuit with a flow-restoration valve or flow-blocking component, wherein the restoring flow communication involves valve-openings or closings of the flow-restoration valve or flow-blocking component that are executed by a programmable controller as a timed, sensor-responsive, or algorithmic multi-phase sequence.

2. The method of claim 1, wherein the depressurization valve or flow-blocking component is mounted on a riser or equivalent geometry to preferentially vent gas and minimize liquid discharge, and wherein actuating the depressurization valve or flow-blocking component vents the isolated portion to near-atmospheric pressure prior to operation of the pump of claim 1, thereby creating a low-pressure injection environment for the pump while the main circuit remains at the main circuit pressure.

3. The method of claim 1, wherein the programmable controller defines fixed time intervals for the steps of isolating a portion of the branch circuit, depressurizing the isolated portion, injecting the measured dose, and restoring flow communication.

4. The method of claim 1, wherein the step of injecting the measured dose or restoring the flow communication is performed by the programmable controller after the programmable controller receives feedback from at least one sensor selected from pressure, flow, pH, ORP, turbidity, conductivity, or temperature.

5. The method of claim 1, wherein the programmable controller employs adaptive, model-predictive, or AI-based algorithms to optimize the steps of depressurizing the isolated portion and injecting the measured dose.

6. The method of claim 1, wherein the additive comprises a fluid selected from chlorine, acid, base, fertilizer, disinfectant, pharmaceutical agent, compressed gas, or aerosol.

7. The method of claim 1, wherein the circulating pressurized medium comprises blood or intravenous fluid, and the additive comprises a therapeutic or chemotherapeutic agent.

8. The method of claim 1, wherein the additive comprises a liquid, such as but not limited to chlorine or acid or a gas selected from $CO_2$, $O_2$, anesthetic vapor, compressed air, or other gaseous mixture.

9. A system for introducing an additive into a circulating pressurized medium flowing through a main circuit operating under a main circuit pressure, said system comprising:

a dual-lumen conduit forming a branch circuit at a branch point off of the main circuit;

an isolation valve or flow-blocking component for isolating a portion of the branch circuit;

a depressurization valve or flow-blocking component for reducing pressure in the portion of the branch circuit when the portion of the branch circuit is depressurized to create an isolated portion pressure that is less than the main circuit pressure, including a relative pressure to between 0 and 30% of the main-circuit pressure, the depressurization occurring with minimal continuous pressure drop;

an injection device for injecting the additive, the injection device being operable at the portion of the branch circuit whenever the portion is isolated and depressurized relative to the main circuit pressure, the injection device being of a type that is not in fluid communication with the main-circuit;

a flow-restoration valve or flow-blocking component for restoring fluid communication between the main circuit and the portion of the branch circuit after the portion was isolated and depressurized relative to the main circuit; and a controller for the isolation mechanism, the depressurization mechanism, the injection device, and the flow-restoration mechanism, where the controller is configured for executing a sequenced, timed multi-phase cycle; wherein the system is applicable to circulating water, wastewater, agriculture, semiconductor, gas injection, or biomedical infusion.

10. The system of claim 9 further comprising at least one sensor providing feedback data to the controller where the sensor is selected from pressure, flow, or volume sensors and arranged in the branch circuit.

11. The system of claim 9, wherein the system further comprises a sensor array providing feedback data to the controller where the sensor array includes at least one water quality sensor and at least one pressure or flow sensor.

12. The system of claim 9, wherein the injection device comprises a displacement pump selected from peristaltic, diaphragm, gear, syringe, piston, piezoelectric, or MEMS pumps.

13. The system of claim 9, further comprising an intermediate chamber or reservoir within said portion of the branch between the isolation mechanism and the flow-restoration valve or flow-blocking component.

14. The system of claim 9, wherein the system comprises at least one additional branch circuit wherein the additional branch circuits each include an isolatable portion, isolation valve or flow-blocking component, an injection device and a flow-restoration valve or flow-blocking component, wherein isolation of the isolatable portion of any one of the additional branch circuits is coordinated by the programmable controller, each injection device of the additional branch circuits is configured to inject a different additive relative to one another; and wherein the branch circuit forms a bypass loop off of the main circuit and comprises:

a vent valve arranged on the branch circuit and configured, when actuated, to vent an isolated portion of the branch circuit to near-atmospheric pressure prior to operation of the injection device; and wherein the injection device comprises a low-power pump sized to inject the additive into the isolated portion at said near-atmospheric pressure and is not configured to inject against the main circuit pressure.

15. The system of claim 9, wherein the flow-restoration valve or flow-blocking component comprises a low-cracking-pressure check valve or duckbill valve with a cracking pressure of between 0.05 and 0.15 psi.

16. The system of claim 9 wherein the branch circuit is integrated with the main circuit as an OEM component or installed as a retrofit via tees or manifolds.

17. The method of claim 1, wherein the pressurized medium is water in a pool, spa, cooling tower, or industrial recirculation system.

18. The method of claim 1, wherein the pressurized medium is wastewater, and the additive comprises a disinfectant, flocculant, or coagulant.

19. The method of claim 1, wherein the pressurized medium is irrigation water and the additive comprises a fertilizer, nutrient solution, or pesticide.

20. The method of claim 1, wherein the pressurized medium comprises a process bath in semiconductor manufacturing and the additive comprises an acid, base, or etchant.

21. The system of claim 9, further comprising a backup injection device configured as a hot spare pump system, wherein the controller is programmed to automatically activate the backup injection device upon detection of primary injection device failure or reduced performance, thereby providing redundant injection capability to ensure continuous additive dosing operations.

22. The method of claim 1, wherein the system specifically excludes Venturi injectors or Venturi-effect devices, thereby avoiding the permanent differential pressure losses across the main circuit that characterize Venturi-based injection systems and maintaining full main circuit pressure and flow efficiency during normal operations.

* * * * *